TELEVISION RECEIVER CIRCUIT MEANS FOR STABILIZING BLACK LEVEL ON SCENES OF LOW AVERAGE BRIGHTNESS AND FOR SUPPRESSING BLACK LEVEL ON HIGH BRIGHTNESS SCENES

Original Filed Aug. 9, 1962 3 Sheets-Sheet 1

3,309,462

TELEVISION RECEIVER CIRCUIT MEANS FOR STABILIZING BLACK LEVEL ON SCENES OF LOW AVERAGE BRIGHTNESS AND FOR SUPPRESSING BLACK LEVEL ON HIGH BRIGHTNESS SCENES

Bernard D. Loughlin, Huntington, N.Y., assignor to Hazeltine Research, Inc., a corporation of Illinois Continuation of application Ser. No. 215,968, Aug. 9, 1962. This application Mar. 28, 1966, Ser. No. 538,099
9 Claims. (Cl. 178—7.5)

This application is a continuation of application S.N. 215,968 filed Aug. 9, 1962.

This invention relates to an image-reproducing system for a television receiver and, more particularly, to such a system embodying novel concepts of black level stabilization.

In a television receiver, black level stabilization, as the phrase is used in this specification and in the appended claims, may be defined as the technique of maintaining the direct-current (D.-C.) component of the image signal in such a way that the level of the signal corresponding to black in the televised scene just reaches black in the reproduced image and such that all other levels of the image signal are then reproduced as correct shades of grey and as white. In one form of receiver design, wherein only the alternating-current (A.-C.) components of the image signal are coupled to the picture tube, there is no black level stabilization since the D.-C. component of the signal is deliberately removed and the A.-C. components are made to operate in conjunction with a fixed D.-C. level, usually adjusted by the viewer by means of the brightness control to be correct for some average scene. The viewer must then tolerate the incorrect reproduction that occurs on other scenes.

While this type of circuit may produce good results with such shows as quiz programs, where the lighting remains relatively uniform throughout the program, it produces very poor results when, for example, a program is presented that has a wide variety of scenes ranging from bright daylight to a dimly lit night scene with a few small white areas therein. Similarly, poor results would be realized on commercials where small amounts of black lettering would appear against a white background (a high average brightness scene) and on variety shows where the scene consists of a spotlighted performer against a black background (a low average brightness scene). With this type of program, assuming the viewer had adjusted the brightness level for correct image reproduction on a scene of intermediate brightness, then when the night scene comes on (corresponding to low average brightness), blacks in the scene appear as greys and, in general, the image has a washed-out appearance. Also, when the scene changes to one of high average brightness, such as a sunny afternoon on the beach, low level greys become suppressed to black and the image may have an overly "contrasty" appearance. In general, the latter condition is less annoying than the condition resulting from the night scene. This is because its effects are relatively less noticeable and also because the high brightness scenes tend to occur much less frequently than the low brightness scenes. As will be made clear subsequently, the present invention takes full advantage of this fact in a novel manner.

Two well-known techniques of black level stabilization are: (1) D.-C. coupling, and (2) D.-C. restoration. In general, the object of both techniques is to ensure that the brightness of the reproduced image corresponds to the brightness of the televised scene; in other words, to permit the brightness of the reproduced image to follow, as faithfully as possible, variations in the brightness of the televised scene. The phrase "average brightness" will be used hereafter to refer to the over-all brightness of the image as represented by the D.-C. component of the image signal. Additionally, the phrase "instantaneous brightness" will be used when referring to the total light output of an elemental area of the image as produced by the combination of the image signal's A.-C. components with a D.-C. component, either as derived from the image signal in the case of a black level stabilized receiver, or the fixed D.-C. level as adjusted by the viewer in the case of an A.-C. coupled receiver.

D.-C. coupling, as its name implies, retains the D.-C. component of the image all the way from the video detector through the video amplifier stages to the input of the picture tube. This type of black level stabilization in its truest form, i.e. where the D.C. component is faithfully coupled to the picture tube for all possible values of average brightness in the televised scene, is not generally used in commercial practice because of inherent problems which arise with D.-C. coupled circuits. For example, it is relatively difficult and expensive to provide a power supply which will work satisfactorily with these D.-C. coupled circuits. Also, the stability of the D.-C. coupled circuits in the presence of variations in circuit parameters may be difficult to maintain.

In the case of D.-C. restoration, A.-C. coupling is used between the video detector and the picture tube. Then the D.-C. restorer circuit is connected at some point between the A.-C. coupling device and the picture tube to clamp some suitable reference level in the signal to a fixed potential. In conventional D.-C. restorer circuits, the synchronizing peaks of the composite television signal are set at a fixed potential, and the various biases on the picture tube are adjusted such that black level in the image signal just reaches beam current cutoff in the picture tube so as to correctly reproduce black in the image and such that the remaining amplitudes in the image signal correctly reproduce the various shades in the televised scene. In other words, as its name implies, the D.-C. restorer circuit effectively restores the D.-C. component of the image signal, either by reinserting the D.-C. component in the image signal or by suitably adjusting grid-cathode bias on the picture tube. It has the advantage over D.-C. coupling that, due to the A.-C. coupling, the signal can be set at a more convenient operating level, thus simplyfying the circuit design. However, the main difficulty with this type of circuit is that its operation is highly susceptible to being upset by impulse noise in the image signal, unlike the D.-C. coupled circuits which are not appreciably affected by impulse noise. Unless relatively complex and expensive precautions are taken, keyed clamping circuits being a typical example, it is possible to have the restorer respond to a noisy signal in such a manner as to cause the reproduced image to become white or milky in appearance.

Additionally, there is one problem that D.-C. coupling and D.-C. restoration have in common. At the present time it is the usual practice to provide the anode of the picture tube with a high voltage of the order of 20,000 volts by means of a high voltage supply circuit in the output of the horizontal beam deflection circuit. This high voltage supply circuit, although capable of providing such a high voltage, has a relatively low power capacity. This means that it is not capable of operating correctly with high average beam currents in the picture tube. High average beam currents would tend to occur with either D.-C. coupling or D.-C. restoration when the televised scene has a high average brightness level corresponding to high values of the D.-C. component in the image signal. The sunny afternoon beach scene is a good example of a scene that may cause this problem to occur. The failure of the high voltage supply circuit under these conditions is referred to as "overload" of the supply. If the D.-C. component of the image signal were high enough, the side effects caused by the overload could be sufficient, in some cases, to make the horizontal beam deflection circuit operate improperly or even break down altogther. Insofar as this problem is concerned, the A.-C. coupling circuit provides a distinct advantage over either D.-C. coupling or D.-C. restoration circuits; another fact which is advantageously used in the present invention.

It is, therefore, an object of the present invention to provide an image-reproducing system embodying novel concepts of black level stabilization which avoids one or more of the aforementioned disadvantages.

It is also an object of the present invention to provide an image-reproducing system embodying black level stabilization which is not susceptible to high voltage supply overload.

It is also an object of the present invention to provide an image-reproducing system embodying black level stabilization which is not susceptible to impulse noise.

It is still further an object of the present invention to provide an image-reproducing system that employs black level stabilization techniques on scenes where its advantages would be most apparent without incurring the disadvantages, associated with black level stabilization, on scenes where the stabilization is not important subjectively.

Thus, in accordance with the invention, there is provided an image-reproducing system in a television receiver adapted to receive a television signal including an image-representative signal having alternating-current components representative of variations in instanteous brightness and a direct-current component representative of average scene brightness which may vary from scene to scene and having a level intended to correspond to black in the reproduced image. This system comprises means for supplying the image-representative signal, means, including a cathode-ray tube, for reproducing the image, and means for coupling the image signal to the cathode-ray tube for controlling the grid-to-cathode voltage of the tube in accordance with variations in the average scene brightness of the image representative signal to stabilize black level in the reproduced image on scenes of low average brightness and to suppress black level in the reproduced image on scenes of high average brightness.

For a better understanding of the present invention, together with other and further objects thereof, reference is had to the following description, taken in connection with the accompanying drawings, and its scope will be pointed out in the appended claims.

Referring to the drawings.

Figure 1:
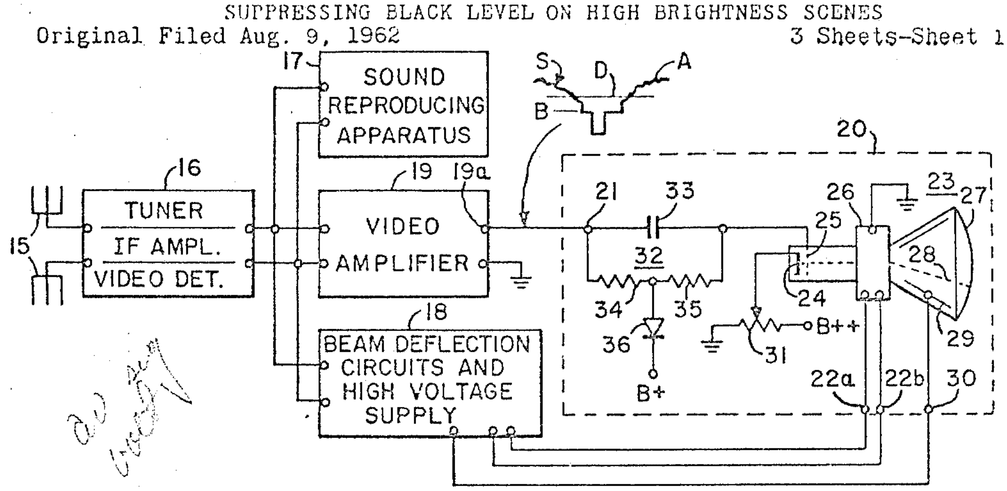
FIG. 1 is a combination block and circuit diagram of a monochrome television receiver embodying an image-reproducing system constructed in accordance with one form of the present invention.
Figure 3A:
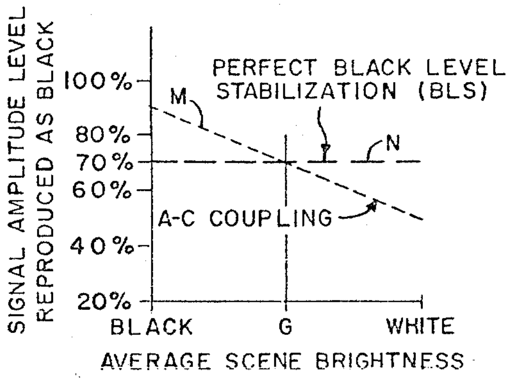
Figure 3B:
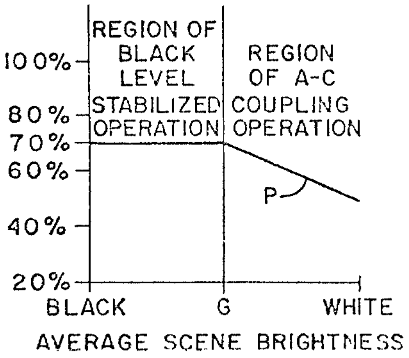
Figure 4:
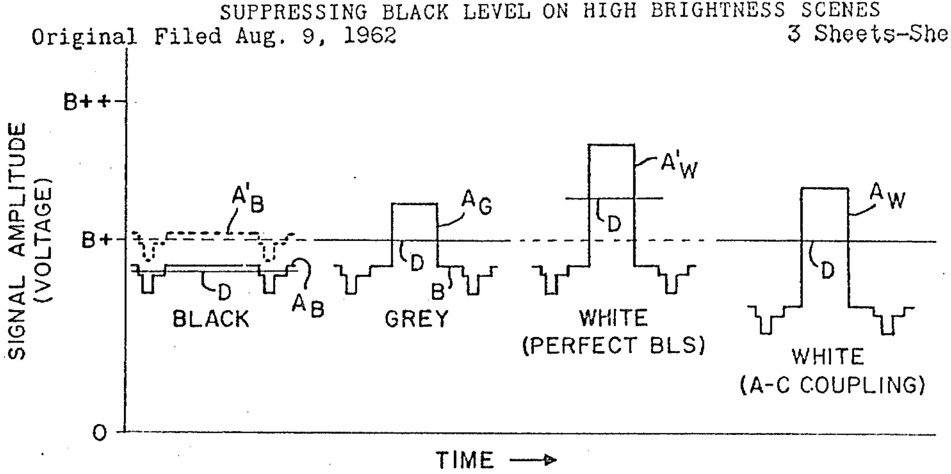
Figure 5:
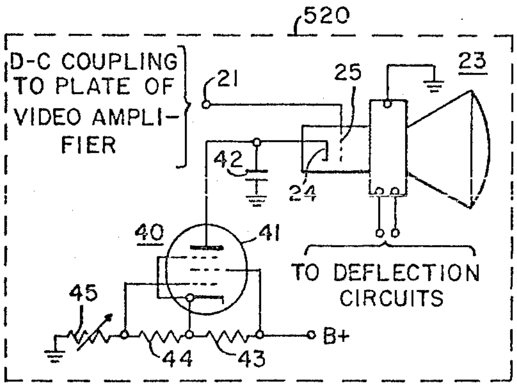
Figure 7:
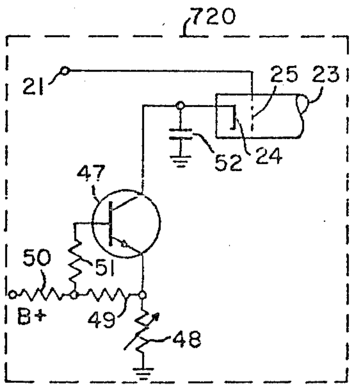
Figure 6A:
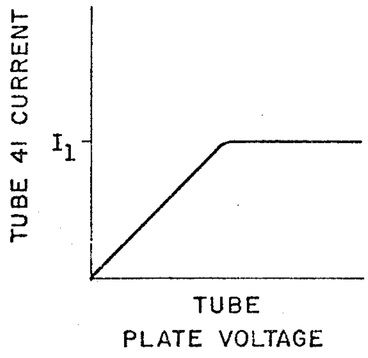
Figure 6B:
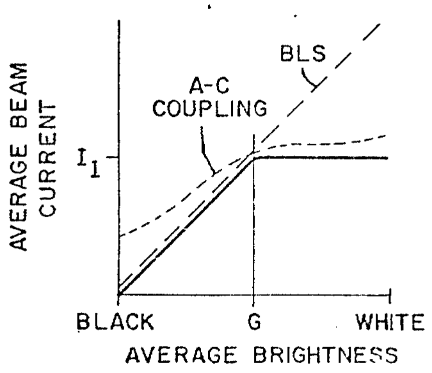
Figure 8:
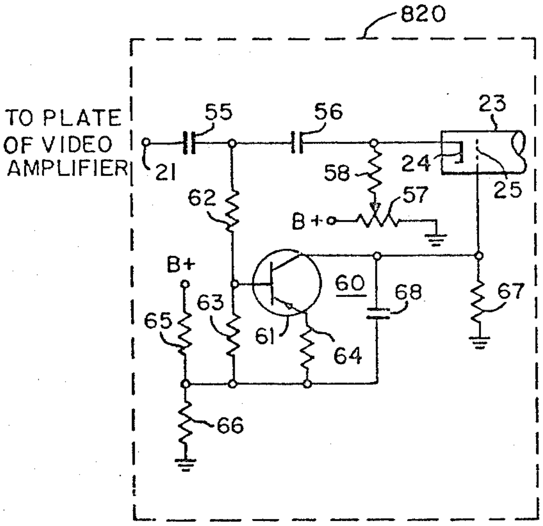
Figure 10:
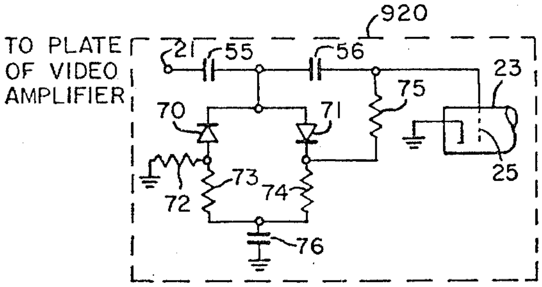
Figure 9A:
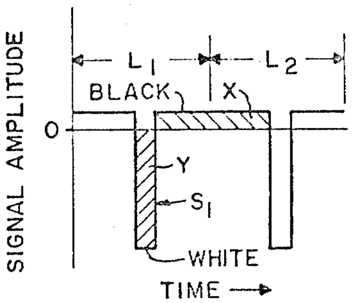
Figure 9B:
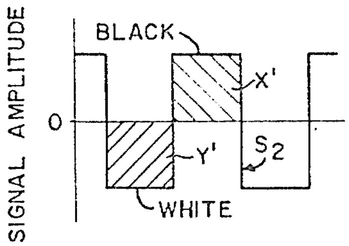
Figure 9C:
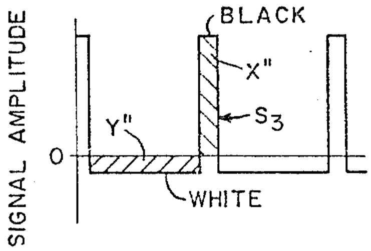
Figure 9D:
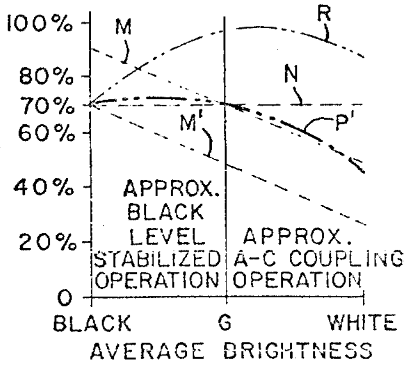

FIGS. 3*a* and 3*b* are diagrams graphically illustrating the present invention and used in explaining the operation of the image-reproducing system of FIG. 1;

FIG. 4 is a signal diagram useful in explaining the operation of the image-reproducing system of FIG. 1;

FIG. 5 is a circuit diagram of an image-reproducing system constructed in accordance with another form of the present invention;

FIGS. 6*a* and 6*b* are diagrams of operating characteristics of portions of the FIG. 5 circuit which are useful in explaining the operation thereof;

FIG. 7 is a circuit diagram of a transistorized version of the FIG. 5 circuit;

FIG. 8 is a circuit diagram of an image-reproducing system constructed in accordance with another form of the present invention;

FIGS. 9*a*–9*c* are signal diagrams used in explaining the operation of the circuit shown in FIG. 8;

FIG. 9*d* is a diagram similar to those of FIGS. 3*a* and 3*b* and which is used in explaining the operation of the FIG. 8 circuit; and FIG. 10 is a circuit diagram of a modified form of the FIG. 8 circuit.

Figure 2:
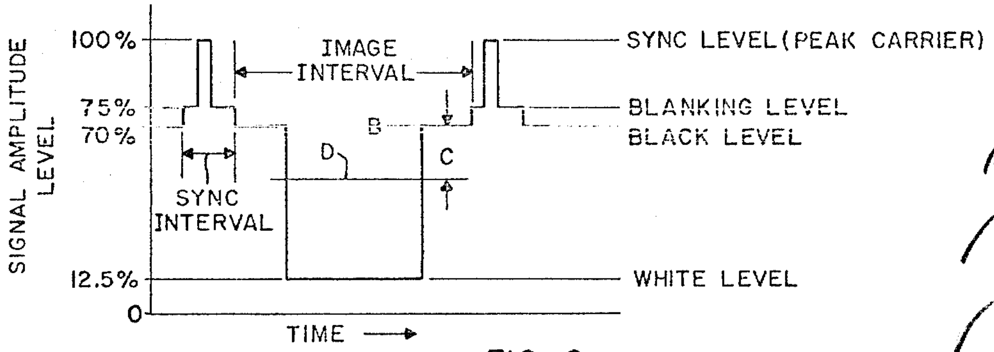
FIG. 2 is a signal diagram of a portion of a negative modulation television signal.

There is shown in FIG. 1 a monochrome television receiver which conventionally includes an antenna 15 and and input system 16, comprising the usual tuner, IF amplifier stages, and video detector for intercepting the transmitted television signal, converting it to an intermediate frequency, amplifying it to a suitable level, and for detecting the modulation envelope thereof as shown in FIG. 2. In addition, a sound carrier signal is provided at the output of the video detector and is coupled to conventional sound-reproducing apparatus 17. The detected modulation envelope is coupled to beam deflection circuits 18, being of conventional construction, to separate the synchronizing signals occurring during the synchronizing intervals and to generate beam deflection signals to synchronize operation of the receiver with that at the transmitter. The modulation envelope at the output of the video detector is also coupled to video amplifier 19, wherein the detected television signal is amplified to a suitable level and supplied with the proper polarity through input terminal 21 to image-reproducing system 20. For the purposes of this specification, it will be assumed that D.-C. coupling is used between the video detector and the video amplifier 19 so that the composite television signal appearing at output terminal 19*a* (corresponding to the plate of the video amplifier) contains both A.-C. components and the D.-C. component of the image signal. The horizontal and vertical deflection signals at the output of deflection circuits 18 are supplied to the beam deflection yoke 26 via input terminals 22*a* and 22*b*. In addition, a high voltage of the order of 20,000 volts is conventionally generated at the horizontal output circuit in deflection circuits 18 and supplied via input terminal 30 to anode 29 of image tube 23.

*Image-reproducing system 20 of FIG. 1*

In accordance with the invention, image-reproducing system 20 includes means such as input terminal 21 for supplying a television signal S, including an image-representative signal having A.-C. components A, a D.-C. component D which may vary from scene to scene, and having a level B intended to correspond to black in the reproduced image. The system also includes means responsive to the image-representative signal for reproducing the image. This means includes picture tube 23 of the cathode-ray type having a cathode 24 to which a suitable bias is applied from the movable tap of adustable potentiometer 31 coupled across a source of potential B++.

The image-reproducing means also includes means 32 for effectively maintaining black level operation in the image when the D.-C. component D in the supplied image signal S is relatively low in value and which permits black level operation to substantially deteriorate to essentially A.-C. coupling as the D.-C. component D increases in value. As shown in FIG. 1, means 32 comprises first and second coupling paths, the first coupling path including capacitor 33, connected from input terminal 21 to image tube control grid 25 for coupling thereto the A.-C. components A in the image signal. The second coupling path includes resistors 34 and 35, connected in series from input terminal 21 to the picture tube control grid 25, thereby providing a shunt D.-C. path around capacitor 33 for coupling the D.-C. component D of the image signal to the picture tube 23. However, a bias level B+ is applied through a diode 36 to the common connection between resistors 34 and 35 in the D.-C. coupling path to limit the amplitude of the D.-C. component which may be coupled to the picture tube. For this purpose, diode 36 is poled to remain nonconductive for all values of the D.-C. component D which are equal to or less than the bias level B+, and to become conductive for all values of the D.-C. component which are greater than bias level B+. It should be understood, however, that this polarity of diode 36 applies only in the case where the picture is grid-driven by the image signal. When the image signal is coupled to the cathode 24 of the picture tube, the signal polarity must be reversed and, consequently, the polarity of the diode must be reversed. In the latter case, the diode would, therefore, remain nonconductive for all values of the D.-C. component D equal to or greater than bias B+ and would become conductive on the D.-C. component values less than bias B+.

Before considering the operation of image-reproducing system 20 in its entirety, the operation of an A.-C. coupled receiver will be briefly reviewed. This is equivalent to considering system 20 as though resistors 34 and 35 and diode 36 were removed and replaced by a suitable bias supply connected to control grid 25. Referring to FIG. 2, the signal shown represents a little more than one horizontal line of an image comprising a broad white bar on a black background. In accordance with standard television practice, synchronizing pulse peaks, blanking level, and black level occur at fixed percentages of peak carrier level, 100%, 75%, and 70%, respectively, as shown. On the other hand, the levels at which signal amplitudes occur during the image interval depend on the televised scene. Accordingly, the D.-C. level D, corresponding to the average brightness of the televised scene, will vary from scene to scene. Referring now to FIG. 4, curves $A'_B$, $A_G$, and $A_W$ show the composite television signal as it would appear at the picture tube control grid 25 with A.-C. coupling for three brightness conditions; black, grey bar, and a white bar, respectively. If it is assumed that the D.-C. bias on control grid 25 has been set by a suitable control potentiometer (not shown) so that black level B just reaches beam current cutoff for the grey bar scene, then the black scene would actually be reproduced as grey, since black level on signal $A'_B$ would not reach cutoff. Also, it can be seen clearly that black level on signal $A_W$ is considerably beyond cutoff so that if there were any low level detail in the signal it would be uniformly reproduced as black in the image, thereby being lost.

In FIG. 3*a*, dotted line M shows how the signal amplitude level which is reproduced as black varies as a function of average brightness of the scene for a somewhat arbitrary setting of fixed bias on the picture tube control grid 25. Line M, therefore, could be moved up or down by readjusting the grid bias setting.

In a receiver of the type employing perfect black level stabilization, where black level in the signal is stabilized for all values of the D.-C. component D, curves $A_B$, $A_G$, and $A'_W$ in FIG. 4 illustrate the composite television signal as it would appear at the picture tube control grid 25 for the same black, grey bar, and white bar scenes, as were mentioned above. Here, by virtue of the stabilization of black level at a fixed voltage level, the D.-C. component D increases at control grid 25 as the brightness of the scene increases. If it is assumed that bias level B+ on control grid 25 corresponds to the maximum average beam current which could be drawn in picture tube 23 without causing overload of the high voltage supply, then it is apparent that any signal having a higher D.-C. component than that of curve $A_G$ would cause overload, curve $A'_W$ being an example of such a signal.

Dash line N in FIG. 3*a* illustrates that the signal level reproduced as black remains constant, preferably so that black level in the signal is reproduced as black in the image.

Considering now the operation of image-reproducing system 20, A.-C. components of the image signal are coupled through from input terminal 21 to control grid 25 via capacitor 33. As long as the D.-C. component of the image signal is equal to or below the level B+, diode 36 remains nonconductive, and the variations in the D.-C. component of the signal are coupled from input terminal 21 through resistors 34 and 35 to control grid 25. This condition corresponds, in FIG. 3*a*, to operation along dash line N for average scene brightnesses ranging from black to an intermediate value G and is shown in FIG. 3*b* as the region of black level stabilized operation. However, when the brightness of the televised scene is such that the D.-C. component D tries to rise above the potential B+, diode 36 begins to conduct and clamps the D.-C. level in the D.-C. coupling path at B+, much the same as a manual brightness control would fix the D.-C. value at the control grid. The circuit at this point becomes effectively an A.-C. coupled circuit with the A.-C. components riding on the fixed bias level B+, as sown by curve $A_W$ in FIG. 4. This corresponds, in FIG. 3*a*, to operation along dotted line M for average scene brightnesses in excess of the intermediate value G up to the maximum brightness level for an all-white scene, and is shown in FIG. 3*b* as the region of A.-C. coupling operation. In summary, the receiver is seen to have two modes of operation in that it operates as a black level stabilized receiver for all values of average scene brightness below the intermediate value G and as an A.-C. coupled receiver for those values above G.

The intermediate average brightness value G at which system 20 is made to change from D.-C. coupling to A.-C. coupling will depend primarily on the limit to which the average beam current may go before overloading the high voltage supply circuit. It will, therefore, be different for different receivers. The value of potential B+ is chosen to be whatever suitable value is necessary to prevent the D.-C. component from rising above that which would produce overload. For example, a typical value would be a D.-C. component which is 50% of the maximum value occurring on an all-white scene.

*Image-reproducing systems 520 of FIG. 5 and 720 of FIG. 7*

There is shown in FIG. 5 an image-reproducing system 520 differing from system 20 in FIG. 1 in that the two-mode operation, i.e. black level stabilized operation on low average brightness scenes and A.-C. coupling operation on high average brightness scenes, is achieved by controlling the average beam current in image tube 23, rather than controlling the average signal voltage as in FIG. 1. Thus, system 520 includes an input terminal 21 for supplying the image-representative signal. As previously mentioned, terminal 21 is direct-coupled through the video amplifier 19 to the video detector in unit 16, so that the D.-C. component of the image signal, as well as the A.-C. components, is applied to control grid 25. It also includes current-control means 40, coupled in the cathode circuit of picture tube 23 for controlling beam current in the tube in accordance with a predetermined input-output characteristic of control means 40 to maintain black level operation in the image when the D.-C. component of the image signal is relatively low in value and to permit black level operation to deteriorate substantially to A.-C. coupling as the D.-C. component increases. More specifically, control means 40 includes a pentode 41 having an input-output characteristic as shown in FIG. 6*a*. The D.-C. component of the beam current flows through pentode 41, while the A.-C. components thereof are bypassed to ground through capacitor 42. Pentode 41 is biased by means of a voltage divider network comprising resistors 43, 44, and 45, so that it operates below the knee of its characteristic curve, i.e. along the sloping portion thereof, for average values of beam current corresponding to low brightness levels in the reproduced image below the aforementioned value G. However, the biases are set so that, as the average beam current in picture tube 23 attempts to increase beyond a value $I_1$ corresponding to the value which would be produced by an image signal representative of the average brightness value G, the pentode operates above the knee of its charatceristic; that is to say, over the level portions thereof. This prevents the average value of beam current from rising above $I_1$. In other words, when the pentode 41 is operating below the knee of the characteristic curve on low average brightness scenes, it presents effectively a low D.-C. impedance in the cathode circuit of picture tube 23 and, when operating above the knee on high average brightness scenes, it presents a very high D.-C. impedance which is effectively an open circuit. Thus, there is presented either a D.-C. or an A.-C. circuit in the cathode circuit of picture tube 23, depending on the average brightness level, thereby causing average beam current to vary as shown by the heavy line in FIG. 6*b*, which illustrates that black level stabilization is achieved on scenes of low average brightness and effectively A.-C. coupling operation is achieved on scenes of high average brightness. In this respect, the similarity to the circuit of FIG. 1 is readily apparent.

FIG. 7 shows a transistorized version of the control means shown in FIG. 5. Thus, a transistor 47 has its collector connected to the cathode of picture tube 23 and bypassed to ground through capacitor 52. The base-emitter bias of transistor 47 is set by resistor network 48, 49, 50, and 51 so that on scenes of low average brightness the transistor operates below the knee of its collector current characteristic (which is similar to a pentode characteristic) and, thus, the average beam current in tube 23 is permitted to vary in accordance with variations of the D.-C. component in the image signal. However, on scenes of high average brightness, transistor 47 operates above the knee of the collector current characteristic, resulting in a high D.-C. impedance and preventing the average beam current from varying with variations in the D.-C. component of the image signal.

*Image-reproducing system 820*

There is shown in FIG. 8 an image-reproducing system differing from those of FIGS. 1, 5, and 7 by virtue of the fact that, in system 820, an approximation is made to the type of operation as described above and which is achieved with a higher degree of accuracy in systems 20, 520, and 720. However, the degree of approximation is sufficiently close so that the concept is essentially unchanged and, therefore, the advantages of the invention are realized. Thus, system 820 includes input terminal 21 for supplying the image-representative signal as previously described. It also includes a picture tube 23 for reproducing the image from the supplied signal. Circuit means including capacitors 55 and 56, serially connected from input terminal 21 to the cathode 24 of picture tube 23, i.e. with the D.-C. component of the image signal blocked. A manual brightness control potentiometer 57 with its movable tap coupled through resistor 58 to the cathode 24 is provided for adjusting the bias on cathode 24.

System 820 also includes D.C. restoration means 60 for maintaining black level stabilization in accordance with the average value of the image-representative signal, whereby effectively black level operation is maintained in the image on relatively low values of the D.-C. component of the image signal and is permitted to substantially deteriorate to A.-C. coupling as the value of the D.-C. component increases. More specifically, the D.-C. restoration means 60 comprises a transistor 61 with its base connected through resistor 62 to the intermediate terminal between capacitors 55 and 56. Base and emitter bias resistors 63 and 64 are provided to render transistor 61 conductive on one polarity of the applied image signal. The over-all operating level of transistor 61 is set by voltage divider network 65, 66. The collector of transistor 61 is coupled to control grid 25 of picture 23 and through a load resistor 67 to ground. Bypass capacitor 68 is coupled from the collector of transistor 61 through emitter resistor 64 of the emitter thereof.

In operation, D.-C. restorer means 60 serves as a combined averaging detector and amplifier. It detects the average value of the image signal as measured from its zero A.-C. axis and develops, across resistor 67, a bias proportional to this detected average value. The manner in which this provides an approximation to black level stabilized operation on scenes of low average brightness and an approximation of A.-C. coupling operation on scenes of high average brightness may be understood by referring to FIGS. 9*a*–9*d*.

In FIGS. 9*a*–9*d*, two line intervals $L_1$, $L_2$ of an image signal are shown with the synchronizing components removed for the sake of clarity. The signal $S_1$ in FIG. 9*a* represents a scene of low average brightness in which the scene is mostly black with a single narrow white bar. The areas X and Y above and below the zero axis are equal and relatively low in value. In FIG. 9*b*, signal $S_2$ represents a scene of intermediate brightness, for example equivalent to the aforementioned value G. Again, the areas X' and Y' are equal but are substantially higher in value than the areas X and Y of FIG. 9*a*. In FIG. 9*c*, a signal $S_3$ for a predominantly white scene is shown. Areas X'' and Y'' are equal and now are relatively low in value, being about the same as X and Y in FIG. 9*a*. The manner in which these areas continuously vary is shown in FIG. 9*d* by dot-dash line R. Thus, if the image signal is uniformly black, its average value measured from the zero A.-C. axis is essentially zero. Then, as the average brightness of the scene increases, the average value of the signal measured from the A.-C. axis increases until it reaches a maximum at some value of average brightness a little in excess of 50%. It does not correspond to the 50% point due to the presence of the synchronizing components. Similarly, it does not fall completely back to zero on an all white scene due to the synchronizing components. This accounts for the asymmetrical appearance of line R in FIG. 9*d*. Dotted line M corresponds to dotted line M of FIG. 3*a* and shows the signal amplitude levels reproduced as black for an A.-C. coupled receiver. As previously explained, black is correctly reproduced at one point where it intersects the black level stabilization line N, and which may be arbitrarily set by the manual brightness level adjustment. Therefore, line M' is the same as line M except re-adjusted downwards by the manual brightness control 57. It will be appreciated that by adjusting the A.-C. coupling at the picture tube cathode 24 to operate along dotted line M' and by varying the bias on control grid 25 in accordance with line R, the combined effect in the reproduced image will be in accordance with the sum of the two; in other words, along dot-dash line P'. It can be seen that line P' very closely approximates line P of FIG. 3*b* in that approximate black level stabilized operation is realized on all scenes of low average brightness below the value G and approximate A.-C. coupling operation is realized on scenes of high average brightness above the value G. The gain of D.-C. restorer 60 is appropriately adjusted so that line P' follows closely with the desired operation.

While applicant does not wish to be limited to any particular set of circuit constants, the following have proved useful in the image-reproducing system 820 of FIG. 8:

| | | |
|---|---|---|
| Potentiometer 57 | kilohms (max.) | 100 |
| Resistor 58 | kilohms | 47 |
| Resistor 62 | do | 68 |
| Resistor 63 | do | 22 |
| Resistor 64 | do | 4.7 |
| Resistor 65 | do | 10 |
| Resistor 66 | do | 3.9 |
| Resistor 67 | do | 47 |
| Capacitor 55 | microfarads | 0.5 |
| Capacitor 56 | do | 1.0 |
| Capacitor 68 | do | 1.0 |
| Potential B+ | volts | 150 |
| Transistor 61 | | 2N1371 |
| Picture Tube 23 | | 17BP4A |

FIG. 10 shows a black level stabilization system 920 similar to system 820 of FIG. 8 in that it D.-C. restores in accordance with the average value of the image measured from its zero axis. However, in addition to the fact that it works with a grid-driven picture tube, it also differs in that it average-detects both polarities of the image signal, thereby obviating the need for gain in the averaging D.-C. restorer. To this end, image-reproducing system 920 includes, in addition to the A.-C. coupling provided by capacitors 55 and 56, the D.-C. restorer circuit comprising diodes 70 and 71, poled respectively to conduct on opposite polarities of the A.-C. coupled signal, resistors 73 and 74, and capacitor 76. The detected bias is applied to control grid 25 by resistor 75 and resistor 72 provides a D.-C. return path to ground.

While there have been described what are, at present, considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An image-reproducing system in a television receiver adapted to receive a television signal including an image-representative signal having alternating-current components representative of variations in instantaneous brightness and a direct-current component representative of average scene brightness which may vary from scene to scene, and having a level intended to correspond to black in the reproduced image, comprising:
means for supplying said image-representative signal;
means, including a cathode-ray tube, for reproducing the image;
and means for coupling said image signal to said cathode-ray tube and for controlling the grid-to-cathode voltage of said tube in accordance with variations in the average scene brightness of said image-representative signal to stabilize black level in the reproduced image on scenes of low average brightness and to suppress black level in the reproduced image on scenes of high average brightness.

2. An image-reproducing system in a television receiver adapted to receive a television signal including an image-representative signal having alternating-current components representative of variations in instantaneous brightness and a direct-current component representative of average scene brightness which may vary from scene to scene, and having a level intended to correspond to black in the reproduced image, comprising:
means for supplying said image-representative signal;
means, including a cathode-ray tube having an external beam current path, for reproducing the image;
means for direct-current coupling said image-representative signal to the control grid of said cathode-ray tube;
and current control means, having an electron device coupled directly in said beam current path, for permitting substantial variations in average beam current on scenes of low average brightness to stabilize black level in the reproduced image and for maintaining said average beam current substantially constant on scenes of high average brightness to suppress black level in the reproduced image.

3. An image-reproducing system in accordance with claim 2 in which the electron device of said current control means is a pentode vacuum tube coupled directly in said beam current path and operative below the knee of the plate current characteristic thereof on scenes of low average brightness for permitting variations in average beam current on said low average brightness scenes to stabilize black level in the reproduced image, and operative above the knee of said characteristic on scenes of high average brightness for maintaining said average beam current substantially constant on said high average brightness scenes to suppress black level in the reproduced image.

4. An image-reproducing system in accordance with claim 2 wherein the electron device of said current control means is a transistor coupled directly in said beam current path, said transistor being biased to be conductive below the knee of the collector current characteristic thereof on scenes of low average brightness and conductive above the knee of the collector current characteristic thereof on scenes of high average brightness for permitting variations in average beam current on said low average brightness scenes to stabilize black level in the reproduced image and for maintaining said average beam current substantially constant on said high average brightness scenes to suppress black level in the reproduced image.

5. An image-reproducing system in a television receiver adapted to receive a television signal including an image-representative signal having alternating-current components representative of variations in instantaneous brightness and a direct-current component representative of average scene brightness which may vary from scene to scene, and having a level intended to correspond to black in the reproduced image, comprising:
means for supplying said image-representative signal;
means, including a cathode-ray tube, for reproducing the image;
means for alternating-current coupling said image-representative signal jointly to said cathode-ray tube and to a direct-current restoration means;
and direct-current restoration means, including an average detector circuit responsive to the alternating-current component of said image-representative signal, for detecting the alternating-current average value of said alternating-current components measured from the alternating-current zero axis, for developing a direct-current bias proportional to said alternating-current average value and for supplying said bias to the control grid of said cathode-ray tube to stabilize black level in the reproduced image on scenes of low average brightness and to suppress black level in the reproduced image on scenes of high average brightness.

6. An image-reproducing system in accordance with claim 5 wherein said average detector circuit detects the alternating-current average value of only one polarity of said alternating-current components and amplifies the detected signal to develop said direct-current bias.

7. An image-reproducing system in accordance with claim 5 wherein said average detector circuit detects the average value of both polarities of said alternating-current components and supplies the detected signal to the grid of said cathode-ray tube as said direct-current bias.

8. An image-reproducing system in a television receiver adapted to receive a television signal including an image-representative signal having alternating-current components representative of variations in instantaneous brightness and a direct-current component representative of average scene brightness which may vary from scene to scene, and having a level intended to correspond to black in the reproduced image, comprising:

means for supplying said image-representative signal;

means, including a cathode-ray tube, for reproducing the image;

and means, including a first signal coupling path, for alternating-current coupling said image representative signal to said cathode-ray tube, and including a second signal coupling path in parallel with said first path and having a D.-C. clamp circuit responsive to the D.-C. component of said image-representative signal, for coupling said D.-C. component to said cathode-ray tube on scenes of low average brightness to stabilize black level in the reproduced image and for clamping said D.-C. component at a predetermined fixed bias level and supplying said bias level to said cathode-ray tube on scenes of high average brightness to suppress black level in the reproduced image.

9. An image-reproducing system in a television receiver adapted to receive a television signal including an image-representative signal having alternating-current components representative of variations in instantaneous brightness and a direct-current component representative of average scene brightness which may vary from scene to scene, and having a level intended to correspond to black in the reproduced image, comprising:

means for supplying said image-representative signal;

means, including a cathode-ray tube, for reproducing the image;

and means, including a first signal coupling path consisting of a capacitance, for alternating-current coupling said image-representative signal to an electrode of said cathode-ray tube, and including a second signal coupling path in parallel with said first path and having a D.-C. clamp circuit responsive to said D.-C. component, said second signal coupling path consisting of a resistance in shunt across said capacitance and a diode connected from an intermediate point on said resistance to a source of predetermined fixed bias level, for coupling said D.-C. component to the electrode of said cathode-ray tube on scenes of low average brightness to stabilize black level in the reproduced image and for clamping said D.-C. component at said predetermined fixed bias level and for supplying said bias level to the electrode of said cathode-ray tube on scenes of high average brightness to suppress black level in the reproduced image.

References Cited by the Examiner

UNITED STATES PATENTS

| | | | |
|---|---|---|---|
| 2,672,505 | 3/1954 | Schwarz | 178—7.5 |
| 2,825,758 | 3/1958 | Revercomb | 178—7.5 |
| 2,832,824 | 4/1958 | Oakley | 178—7.5 |
| 2,862,052 | 11/1958 | Seright | 178—7.3 |

OTHER REFERENCES

Hannan: "A Keyed D.-C. Restorer for Transistor Circuits," RCA Technical Note, TN381, June 1960.

DAVID G. REDINBAUGH, *Primary Examiner.*

J. McHUGH, R. L. RICHARDSON, *Assistant Examiners.*